United States Patent [19]

Klein

[11] 4,292,381
[45] Sep. 29, 1981

[54] BATTERY CONSTRUCTION FOR UNIFORM ELECTRODE CURRENT DENSITY

[75] Inventor: Martin G. Klein, Brookfield, Conn.

[73] Assignee: Energy Research Corporation, Danbury, Conn.

[21] Appl. No.: 116,772

[22] Filed: Jan. 30, 1980

[51] Int. Cl.³ ............. H01M 2/32; H01M 10/50
[52] U.S. Cl. .............................. 429/120; 429/178; 429/211
[58] Field of Search ............. 429/178, 94, 211, 241, 429/242, 233, 120

[56] References Cited

U.S. PATENT DOCUMENTS

| | | | |
|---|---|---|---|
| 2,855,453 | 10/1958 | Eidensohn | 429/120 |
| 3,179,538 | 4/1965 | Dalin | 429/161 |
| 3,343,987 | 9/1967 | Matsui | 429/233 |
| 3,846,174 | 11/1974 | Barrett | 429/233 |
| 3,981,742 | 9/1976 | Yoneqa et al. | 429/241 |
| 4,098,966 | 7/1978 | Brown | 429/161 |

FOREIGN PATENT DOCUMENTS 118464  9/1918  United Kingdom ............. 429/178

Primary Examiner—Donald L. Walton
Attorney, Agent, or Firm—Watson, Leavenworth, Kelton & Taggart

[57] ABSTRACT

A battery construction comprising positive and negative electrodes provided with tabs, the tabs of the positive and negative electrodes being arranged relative to one another and being of sufficient extent to enable the promoting of uniform electrode current density.

16 Claims, 3 Drawing Figures

BATTERY CONSTRUCTION FOR UNIFORM ELECTRODE CURRENT DENSITY

BACKGROUND OF THE INVENTION

This invention relates to electrochemical cell construction, and, in particular, to the construction of electrochemical battery cells.

In the construction of conventional batteries, and, in particular, alkaline batteries, the battery electrodes are typically arranged in spaced parallel relationship, with the positive electrodes interleaved between the negative electrodes to form a succession of positive and negative electrode pairs. In such construction, separators are situated between successive electrodes to maintain the necessary separation therebetween.

Also in this type of battery construction, each of the electrodes is provided with a tab of limited extent or expanse extending from the electrode edge for connecting that electrode to other electrodes of similar polarity. In typical fashion, the tabs of all positive electrodes extend in a common direction and are joined together, either by welding or mechanical means, internal of the battery housing to form an internal positive terminal. All the tabs of the negative electrodes also extend in such common direction and are similarly joined together to form an internal negative terminal. The internal positive and negative terminals, which are located at the end of the battery casing along the common direction, are connected to respective external positive and negative terminals which extend outward of the battery casing, thereby permitting connection of the battery to external loads. Batteries having this general construction, are disclosed, for example, in U.S. Pat. Nos. 3,179,538, 3,640,775 and 4,098,966.

In charge and discharge operation of the aforesaid batteries, current paths are established between the positive and negative electrodes of each electrode pair. These paths extend from the tab of one electrode of a pair, through the body of that one electrode to points on its surface and thence to points on the surface of the other electrode of the pair, through its body and to its tab. Due to the limited expanse of the electrode tabs, and to the tabs extending in a common direction, the established current paths are of different overall length. The resistance of these paths determined by the effective resistance of the electrodes is, therefore, different and is higher for paths of longer length (i.e., paths which include electrode surface points which are farther from the tabs of their respective electrodes).

The aforesaid paths of different resistance established between respective electrodes of the battery electrode pairs support different currents during the charge and discharge operation. As a result, a non-uniform current distribution or density is created over the expanse of each electrode. This non-uniformity is undesirable as it can result in poor utilization of the electrode active material. Furthermore, since the current paths all extend through respective limited expanse regions adjacent the tabs, these regions of the electrodes are used or exercised to a greater degree than the other regions of the electrodes and, hence, are susceptible to increased capacity decay and structure changes. Both these effects (i.e., electrode non-uniform current density and electrode overuse in tab adjacent regions) become more pronounced as electrode size increases (larger batteries), since larger electrodes have greater internal resistance.

To date attempts have been made by battery designers to eliminate these effects. Thus, the use of massive electrodes or profiled electrodes (more massive at the tab region) have been proposed. These approaches are costly, heavy and do not result in a completely uniform current density or distribution across the battery electrodes.

A further effect in conventional batteries of the above type is the creation or generation of heat in the battery during the charge and discharge operation. This heat can damage battery materials and must be controlled. The thermal management problem becomes more extreme in large size batteries, since the perimeter area to total mass decreases. Batteries are generally poor thermal conductors, making it difficult to efficiently remove internally generated heat which can result in large internal temperature gradients. Such gradients contribute to non-uniformity in performance and reduced life.

The aforementioned U.S. Pat. No. 3,179,538 discloses one approach to reducing or controlling battery temperature by causing cooling liquid to flow above the electrode tabs in parallel paths transverse to electrodes.

It is an object of the present invention to provide a battery construction exhibiting a more uniform current density across the battery electrodes.

It is a further object of the present invention to provide such a battery construction further having improved heat control.

SUMMARY OF THE INVENTION

In accordance with the principles of the present invention the above and other objectives are realized in a battery construction comprising positive and negative electrodes provided with tabs, the tabs of the positive and negative electrodes being arranged relative to one another and being of sufficient extent to enable the promoting of uniform electrode current density. In preferred practice, the positive and negative electrodes are arranged such that tabs of the latter electrodes, which are joined to form a negative terminal, extend opposite to the tabs of the former electrodes, which are joined to form a negative terminal.

With this preferred battery construction, the current paths established between corresponding positive and negative electrode pairs are equalized and, hence, for electrodes of equal effective resistance, carry equal currents. Uniform current density or distribution over the total expanse of each of the electrodes is thereby realized.

In further preferred form, the electrodes of the invention are each of plate construction having a main body area which extends in first and second orthogonal directions. Each tab has first direction extent outward of the electrode main body area and second direction extent of a substantial percentage of the body area second direction extent. In this form of the invention, each electrode main body area is preferably of rectangular configuration and each tab extends substantially along and outwardly of one side of its respective body area.

In a further aspect of the present invention, the tabs of the respective positive and negative electrodes, where joined together to form their respective positive and negative terminals are subjected to a cooling medium directed along the tab extents. In preferred form, respective terminal blocks abut the respective aligned and joined tabs of the positive and negative electrodes and the cooling medium is transported through a central aperture in each block.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
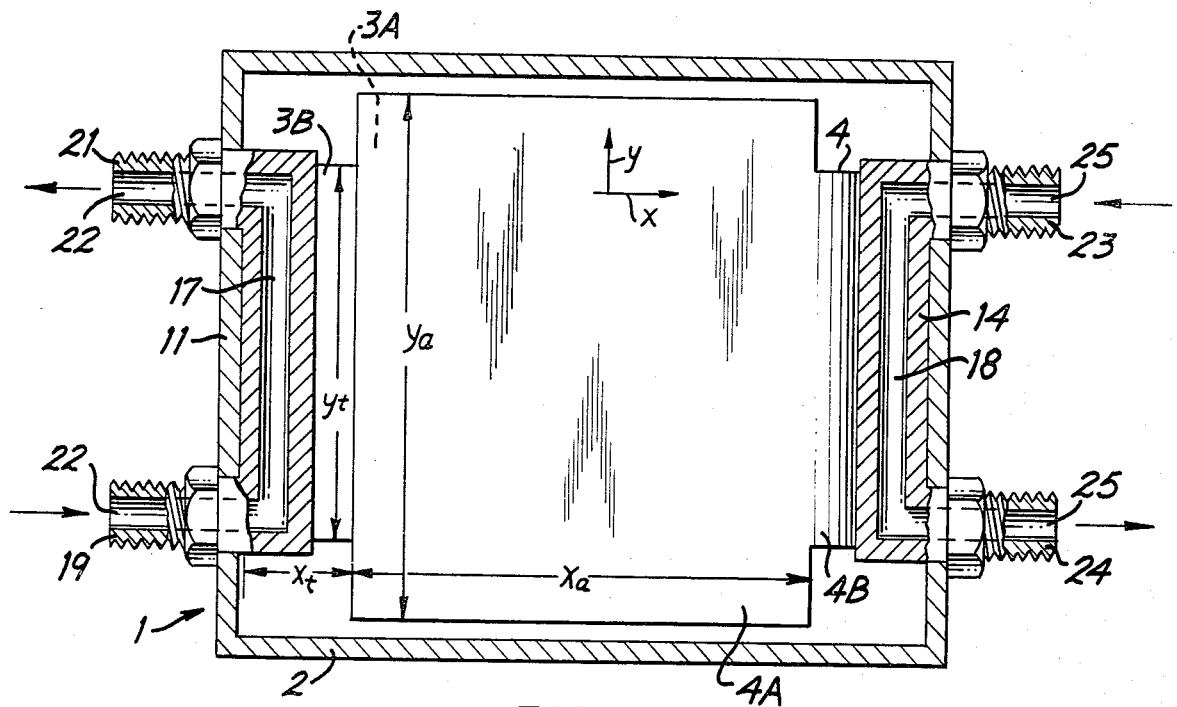
FIG. 1 shows partially in schematic and partially in cross section a plan view of a battery in accordance with the principles of the present invention.

The battery 1 comprises an outer casing 2 in whose interior is disposed pluralities of positive and negative electrodes 3,4. The electrodes 3,4 are arranged in interleaved parallel relationship forming pairs 5 of adjacent positive and negative electrodes. The electrodes are further grouped into upper and lower sets 6 and 7 of electrode pairs.

The positive and negative electrodes 3,4 comprise main body areas or regions 3A, 4A extending in first and second orthogonal directions x and y, and tabs 3B, 4B having x and y direction extent, the former extent being outward of the corresponding body area. In the present illustrative case, each electrode main body areas 3A,4A is of rectangular configuration having side extents $x_a$ and $y_a$ and each tab 3B, 4B is also of rectangular configuration having side extents $x_t$ and $y_t$.

The tabs 3B of the positive electrodes 3 are joined together to form an internal positive battery terminal 8, while the tab regions 4B of the negative electrodes 4 are joined together to form an internal negative battery terminal 9. As shown, the ends of the tabs 3B of the upper and lower sets of electrode pairs 6 and 7 are brought together along their flat faces and sandwiched between opposite flat sides 11A and 11B of a terminal block 11 and respective upper and lower flat plates 12 and 13. Similarly, the ends of the tabs 4B of the upper and lower sets of electrode pairs 6 and 7 are brought together along their flat faces and are sandwiched between opposite flat sides 14A and 14B of a terminal block 14 and respective upper and lower flat plates 15 and 16. Typically, bolts extending through the electrode tab ends, their respective terminal block and flat plates may be used to secure these elements in mechanical and electrical contact.

In accordance with the principles of the present invention, the extent of the tabs 3B, 4B relative to the main electrode areas 3A, 4A and the relative positioning of the tabs 3B, 4B are such as to promote uniform current density across the expanse of the electrodes. In the preferred form of the invention shown, this is accomplished by situating the positive and negative electrodes 3, 4 with their tabs 3B, 4B in opposite disposition and utilizing tabs whose y direction extent $y_t$ is of a substantial percentage of the main electrode area y direction extent $y_a$.

Figure 3:
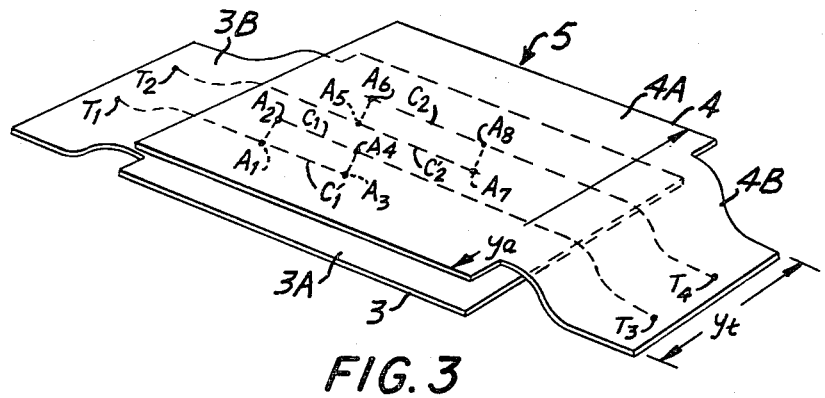
FIG. 3, included for purposes of explanation, shows the current paths established between a positive and negative electrode pair of the battery of FIG. 1.

Tab disposition and tab y extent selection in this manner establishes in the battery for respective electrode pairs 5, current paths of substantially equal length. This can be seen from FIG. 3 which shows a perspective view of one of the electrode pairs 5. As can be seen, the current paths $C_1,C_1'$ and $C_2,C_2'$ established from various points $T_1$ and $T_2$ on the tab 3B to corresponding points $T_3$ and $T_4$ on the tab 4B tend to be parallel and equal regardless of the main electrode area surface points $(A_1, A_2)$, $(A_3,A_4)$, $(A_5,A_6)$ and $(A_7,A_8)$ included in these paths. Since the current paths established between the electrode pairs 5 are of substantially equal length, the resistance of these paths will also be substantially equal provided the effective resistance of the electrodes is substantially equal. Owing to this equality in resistance of the established paths, the current through each path during battery operation will also tend to be equal. The resultant current density across each of the electrodes 3,4 will thus be substantially uniform.

The particular percentage that the tab y extent $y_t$ is of the main electrode area y extent $y_a$ will of course depend upon each particular application, since this will define the main electrode area configuration and the degree of uniformity in electrode current density desired. For the illustrated case of rectangular main electrode areas 3A,4A and rectangular tabs, 3B,4B a percentage of about 50 to 100 percent is useable with a percentage of about 75 to 100 percent being preferable. For other main electrode area configurations, where the y extents may be variable, such as, for example, in main electrode areas of circular configuration, a similar percentage is useable, the percentage in this case being that between the value of tab y extent adjacent the main area and the main area maximum y extent.

As above-discussed, the ends of the tabs 3B,4B, in combination with the terminal blocks 11 and 14 and the plates 12, 13, 15 and 16, form internal positive and negative terminals 8 and 9 for the battery 1. In accordance with a further aspect of the invention, the terminal blocks 11 and 14 are provided with respective ducts 17 and 18 for receiving a cooling fluid and for removing excess heat from the battery. More particularly, these ducts extend along substantially the entire tab y extents, thereby transporting cooling fluid therealong and providing efficient cooling of the electrodes.

Cooling fluid is carried to and from the respective ducts 17 and 18 via channels in dual external terminal studs provided for and supporting each terminal block. Thus, the threaded external terminal studs 19 and 21 extend through the battery casing and screw into the respective block 11 at spaced locations along the duct 17. The studs 19 and 21 are each further provided with internal channels 22 which carry cooling fluid to and from the duct 17. A similar pair of external threaded terminal studs 23 and 24 are provided for supporting and delivering cooling fluid to the terminal block 14. These terminal studs extend through the casing 2 and thread into the block 14 at spaced locations along the duct 18. Channels 25 in the terminals 23 and 24 carry cooling fluid to and from the latter duct.

With the present battery construction, a substantially uniform current density across the entire expanse of each battery electrode 3,4 is obtained as is enhanced electrode cooling. The uniformity in current density promotes entire electrode utilization and, furthermore, prevents electrode change and decay at the tab regions by reducing the concentration of current thereat. A battery exhibiting increased electrode life is thereby realized. Likewise, the cooling of the electrodes along the tab y extents and on opposite battery sides, due to the opposite disposition of the positive and negative electrode tabs, promotes uniform dissipation of heat from the electrodes and battery. This further contributes to extended electrode life and thereby enhanced battery characteristics.

The electrodes 3 and 4 may be conventionally constructed and, in particular, may be of a type utilized in alkaline batteries. Thus, each electrode might typically contain an inner thin plate or current collector which is sandwiched between suitable active material. In such case, each electrode tab might be formed intergrally with the electrode current collector by extending the collector along a portion of one of its sides. In this type of construction, each electrode might also be surrounded by a separator in the form of a membrane envelope to prevent electrical contact with its adjacent electrodes.

Figure 2:
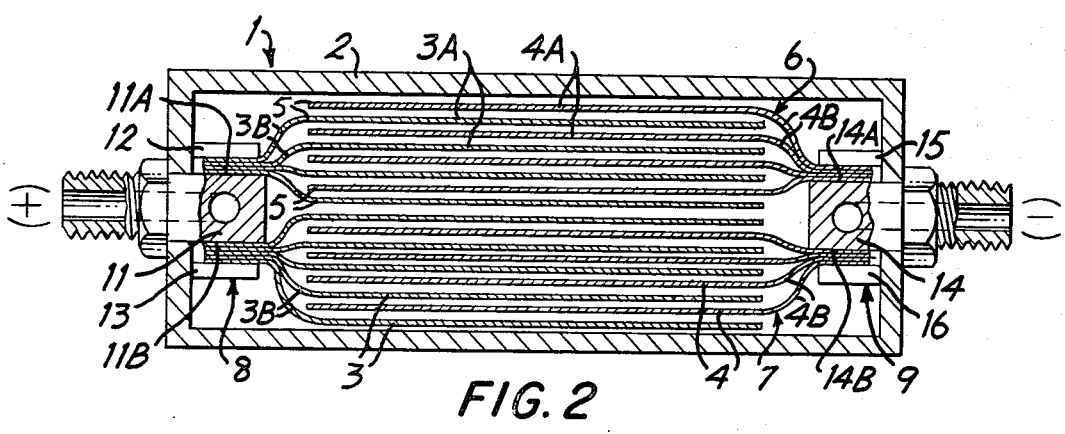
FIG. 2 shows partially in cross section and partially in schematic, a side view of the battery of FIG 1.

A nickel-zinc battery incorporating the principles of the present invention has been constructed and tested. This battery comprised 17 positive and 18 negative electrodes arranged in interleaved parallel relationship as depicted in FIGS. 1 and 2. In this construction, each electrode was of rectangular configuration and included a main electrode area having $x_a$ and $y_a$ dimensions of nine inches and six inches, respectively. Each electrode tab was also of rectangular configuration with dimensions $x_t$ and $y_t$ equal to one inch and six inches, respectively. The positive electrodes each comprised a nickel current collector and an overlayer of nickel active material, while the negative electrodes each comprised a copper current collector and an overlayer of zinc active material. The thickness of the nickel current collectors was 0.003 inches and that of the copper current collectors 0.001 inches to ensure equal effective electrode resistance.

In all cases, it is understood that the above-described arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. An electrochemical cell comprising:
a number of positive electrodes, each of said positive electrodes comprising a first plate forming a current collector and having a main area with first and second direction extent and a tab with first direction extent outward of said main area and second direction extent, the tabs of said first plates being arranged in aligned contacting relationship;
a number of negative electrodes, each of said negative electrodes comprising a second plate forming a current collector and having a main area with first and second direction extent and a tab with first direction extent outward of said main area and second direction extent, the tabs of said second plates being arranged in aligned contacting relationship;
and means for cooling said tabs of said first plates and said second plates, said cooling means including: a first transport means for transporting a cooling medium in the second direction and along the expanse of the face of an exterior tab of said aligned tabs of said first plates; and a second transport means for transporting a cooling medium in the second direction and along the expanse of the face of an exterior tab of said aligned tabs of said second plates.

2. An electrochemical cell in accordance with claim 1 wherein:
each of said first plates comprises a first material;
each of said second plates comprises a second material different from said first material;
the thickness of said first plates being selected relative to the thickness of said second plates and said tabs being arranged relative to one another and being of sufficient extent to enable promotion of uniform current density over said electrodes.

3. An electrochemical cell in accordance with claim 2 wherein:
the second direction extent of each of said tabs is sufficient to enable promotion of said uniform electrode current density.

4. An electrochemical cell in accordance with claim 3 wherein:
said second direction extent of each of said tabs is of a substantial percentage of the second direction extent of the main area corresponding to that tab.

5. An electrochemical cell in accordance with claim 3 wherein:
said second direction extent of each of said tabs has expanse adjacent the main area corresponding to that tab of a substantial percentage of the maximum expanse of the second direction extent of the main area corresponding to that tab.

6. An electrochemical battery cell in accordance with claim 4 or 5 wherein:
said percentage is equal to or greater than fifty percent.

7. An electrochemical cell in accordance with claim 5 wherein:
each of said positive and negative electrodes further comprises active material sandwiching the main area of that electrode.

8. An electrochemical cell in accordance with claim 7 wherein:
said first material comprises nickel;
the active material of each of said positive electrodes comprises nickel;
said second material comprises copper;
and the active material of each of said negative electrodes comprises zinc.

9. An electrochemical cell in accordance with claim 8 wherein:
said thickness of said first plates is greater than said thickness of said second plates.

10. An electrochemical cell in accordance with claim 3 wherein:
said main area and tab of each plate are each of rectangular configuration.

11. An electrochemical cell in accordance with claim 2, wherein:
the thickness of said first plates relative to the thickness of said second plates is such as to provide an effective resistance for each of said first plates which is substantially equal to the effective resistance of each of said second plates.

12. An electrochemical cell in accordance with claim 1 wherein:
said first and second plates are arranged in interleaved relationship to form a number of consecutive pairs of first and second plates, the first plate of each pair being arranged with its tab in opposite disposition to the tab of the second plate of that pair.

13. An electrochemical cell in accordance with claim 1 wherein:
each of said transport means includes:

a terminal block of first and second direction extent arranged to contact said face of said exterior tab of its respective aligned tabs and having a duct running in said second direction for carrying cooling fluid.

14. An electrochemical cell in accordance with claim 13 wherein:

each of said transport means further includes first and second terminal studs connected to the terminal block of that transport means and each having a channel communicating with the duct of that terminal block for carrying cooling fluid thereto and therefrom.

15. An electrochemical cell in accordance with claim 13 wherein:

the aligned tabs of said first plates are arranged in first and second groups of contacting tabs;

the aligned tabs of said second plates are arranged in third and fourth groups of contacting tabs;

said terminal block of said first transport means has first and second cooling surfaces in contacting relationship with respective first and second faces of exterior tabs of said first and second groups;

and said terminal block of said second transport means has third and fourth cooling surfaces in contacting relationship with respective third and fourth faces of exterior tabs of said third and fourth groups.

16. An electrochemical cell in accordance with claim 15 wherein:

each of said transport means further includes:

first and second plates for forcing the respective groups of contacting tabs cooled by that transport means against the respective cooling surfaces of that transport means.

* * * * *